United States Patent
Broll et al.

(10) Patent No.: US 9,195,693 B2
(45) Date of Patent: Nov. 24, 2015

(54) TRANSACTION PREDICTION MODELING METHOD

(75) Inventors: Bjoern Broll, Waldenbuch (DE); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 13/458,784

(22) Filed: Apr. 27, 2012

(65) Prior Publication Data

US 2012/0215751 A1    Aug. 23, 2012

Related U.S. Application Data

(63) Continuation of application No. 12/353,926, filed on Jan. 14, 2009, now Pat. No. 8,224,845.

(30) Foreign Application Priority Data

Jan. 21, 2008   (EP) .................................... 08150446

(51) Int. Cl.
    *G06F 17/00* (2006.01)
    *G06F 17/30* (2006.01)

(52) U.S. Cl.
    CPC .............................. *G06F 17/30306* (2013.01)

(58) Field of Classification Search
    USPC .................................................. 707/703, 810
    See application file for complete search history.

(56) References Cited

U.S. PATENT DOCUMENTS

| | | | |
|---|---|---|---|
| 6,826,727 B1 * | 11/2004 | Mohr et al. .................. 715/235 |
| 7,711,687 B2 | 5/2010 | Rappaport et al. | |
| 7,873,643 B2 | 1/2011 | Hadzikadic et al. | |
| 7,912,871 B2 * | 3/2011 | Shmueli et al. ............... 707/803 |
| 7,958,113 B2 | 6/2011 | Fan et al. | |
| 7,979,368 B2 * | 7/2011 | Kapoor et al. .................. 706/20 |
| 8,224,845 B2 | 7/2012 | Broll et al. | |
| 2002/0099594 A1 | 7/2002 | Heard | |
| 2004/0117395 A1 | 6/2004 | Gong et al. | |
| 2005/0060306 A1 * | 3/2005 | Hattori et al. ...................... 707/3 |
| 2005/0262136 A1 * | 11/2005 | Lloyd et al. ............... 707/103 R |
| 2006/0253427 A1 * | 11/2006 | Wu et al. ............................ 707/3 |
| 2007/0067262 A1 * | 3/2007 | Ramesh et al. .................... 707/2 |
| 2007/0078825 A1 * | 4/2007 | Bornhoevd et al. ............... 707/3 |
| 2007/0250492 A1 * | 10/2007 | Angel et al. ....................... 707/4 |
| 2008/0189639 A1 | 8/2008 | Iyer et al. | |
| 2008/0256444 A1 * | 10/2008 | Wang et al. ................... 715/700 |
| 2008/0288326 A1 * | 11/2008 | Abramowicz .................. 705/10 |
| 2009/0165110 A1 | 6/2009 | Becker et al. | |

* cited by examiner

*Primary Examiner* — Jacob F Bétit
*Assistant Examiner* — Bao Tran

(57) ABSTRACT

The present invention provides database systems configured for creating and utilizing a transactions predictive model using a computer, the database system including: a database management system (DBMS) for handling transactions in the database system, the DBMS including a prediction component for generating the transactions predictive model; a database workload table for capturing commands associated with the transactions, the commands utilized for generating the transactions predictive model; database data for providing data in response to the transactions; and a prediction model database for storing the transactions predictive model, where the prediction component is configured for generating a generalized statement for each statement corresponding with the transactions, identifying a sequence of transactions of the transactions, creating a transaction class based on the sequence of transactions, identifying a current transaction, and then calculating probabilities between transactions, where each statement includes at least a database command.

8 Claims, 4 Drawing Sheets

Fig. 1

(a) Database Workload

| User | Application | Time Slot | Transaction id | Statement |
|---|---|---|---|---|
| Alice | Finance | 08:00 | 1 | Select* from Customers where name = 'Alice' and surname = 'P' |
| Bob | Logistics | 08:01 | 2 | Insert into Client values ('IBM') |
| Alice | Finance | 08:01 | 1 | Insert into Customers values ('Alice', 'Parker') |
| Alice | Finance | 08:02 | 3 | Select from Customers where name = 'Richard' and surname = 'M' |
| Alice | Finance | 08:03 | 3 | Select from Account where knr = '12' |

(b) Generalize Statements

| Statement | Generalization (Anonymization) |
|---|---|
| Select* from Customers where name = 'Alice' and surname = 'P' | Select* from Customers where name = ? and surname = ? |
| Insert into Customers values ('Alice', 'Parker') | Insert into Customers values (?, ?) |
| Select from Customers where name = 'Richard' and surname = 'M' | Select* from Customers where name = ? and surname = ? |
| Select from Account where knr = '12' | Select from Account where knr = ? |

(c) Generate New Generalized Statements

| Statement | Generalized Statements |
|---|---|
| Select* from Customers where name = 'Alice' and surname = 'P' | Select from Customers where name = ? and surname = ? |
| Select from Customers where name = 'Richard' and surname = 'M' | |
| Insert into Customers values ('Alice', 'Parker') | Insert into Customers values (?, ?) |
| Select from Account where knr = '12' | Select from Account where knr = ? |

(d) Creation of Transaction Classes

| Sequence of Generalized Statements | Transaction Classes |
|---|---|
| For User Alice and Application Finance | |
| 1. Select* from Customers where name = ? and surname = ? <br> 2. Insert into Customers values (?, ?) | A |
| 1. Select* from Customers where name = ? and surname = ? <br> 2. Select* from Account where knr = ? | B |

TRANSACTION PREDICTION MODELING METHOD

CROSS-REFERENCE TO RELATED APPLICATIONS

The present invention is a Continuation Application of the following application, all of which are incorporated herein by reference:

Commonly assigned application entitled "TRANSACTION PREDICTION MODELING METHOD," U.S. application Ser. No. 12/353,926, by the same inventors herein.

PRIORITY CLAIM TO FOREIGN APPLICATION

A claim for priority is hereby made under the provisions of 35 U.S.C. §119 for the present application based upon Great Britain Patent Application No. 08150446.6, filed on Jan. 21, 2008, which is incorporated herein by reference.

FIELD OF THE INVENTION

The invention relates to a method of generating a transactions prediction model in a database management system, to a computer program product and to a database management system.

BACKGROUND

A database system is a system designed to manage a database and run operations and commands on the data requested by numerous users. The database management system is a set of programs that manages the organization, storage and retrieval of data in a database. The programs may include: a modeling language to define the schema of each database located in the database management system; data structures as fields, records, files and objects optimized to deal with a very large amount of data stored on a device; and a database query language to allow users to interact with the database and analyze its data and update it.

Most database workloads issued by online transaction processing (OLTP) applications that use a database system follow deterministic rules. The transactions are issued to the database system by the applications, wherein the transactions are constructed by the application logic and the variable parameters received by the input masks of the application.

The optimization of database systems is an important task for reducing the response time of database queries and increasing the transaction throughput. Therefore, a method of generating a transactions prediction model in a database system, a computer program product and a database system is needed.

BRIEF SUMMARY

The present invention provides database systems configured for creating and utilizing a transactions predictive model using a computer, the database system including: a database management system (DBMS) for handling a number of transactions in the database system, the DBMS including a prediction component for generating the transactions predictive model; a database workload table for capturing a number of commands associated with the transactions, the commands utilized for generating the transactions predictive model; database data for providing data in response to the transactions; and a prediction model database for storing the transactions predictive model, where the prediction component is configured for generating a generalized statement for each statement corresponding with the transactions, identifying a sequence of transactions of the transactions, creating a transaction class based on the sequence of transactions, identifying a current transaction, and calculating probabilities between transactions, where each statement includes at least a database command. In some embodiments, the DBMS further includes: a synchronous prediction component for utilizing one of the number of transactions predictive models in real time, the synchronous prediction component configured to access at least the database data in real time.

In some embodiments, the DBMS further includes: an asynchronous prediction component for generating the number of transactions predictive models not substantially in real time, the asynchronous prediction component configured to access at least the database workload table and the prediction model database. In some embodiments, the asynchronous prediction component is located on a separate system from the DBMS and generates the transactions predictive models using an historical workload data. In some embodiments, the asynchronous prediction component submits the transactions predictive models to the synchronous prediction component after the transactions predictive models are generated. In some embodiments, the commands are filtered by one of the group consisting of: a specific user, a specific application, a transaction ID, and a predetermined time slot. In some embodiments, the prediction component is further configured to receive a current transaction, to identify one of the transaction classes corresponding with the current transaction from the transactions prediction model, to predict a next transaction class based on a highest probability of the transactions prediction model, and to pre-fetch data associated with the next transaction class. In some embodiments, the prediction component is further configured to incorporate the current transaction into the predictive model if the pre-fetched data is incorrect.

BRIEF DESCRIPTION OF THE SEVERAL VIEWS OF THE DRAWINGS

In the following preferred embodiments of the invention are described in greater detail by way of example only making reference to the drawings in which:

FIG. 1 shows a block diagram of a method of generating a transaction prediction model according to an embodiment of the invention.

DETAILED DESCRIPTION

Figure 2:
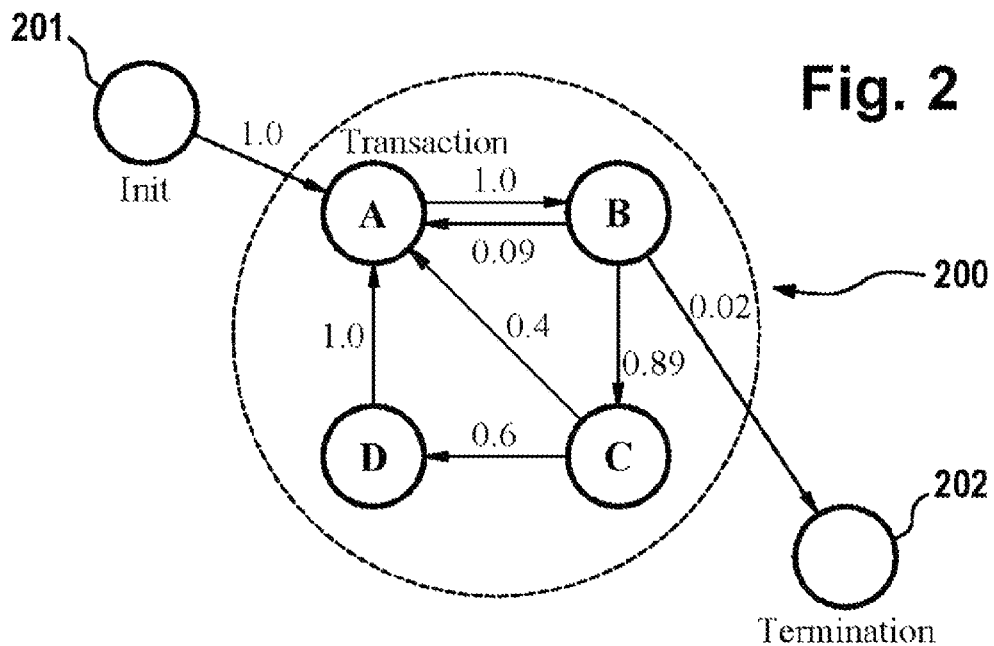
FIG. 2 shows an example of the transaction prediction model for one user using an application.

FIG. 1 shows an example of the method of generating transaction classes, comprising a database workload table 101, a generalization of the statements table 102, a generation of the generalized statements table 103 and a table of the classification of the sequence of generalized statements into transactions 104. The database workload 101 further comprises four columns including the user 105, the application type 106, the time slot 107, the statement 108 and the transaction id 117.

The first step to generate a transaction prediction model requires capturing the database workload. The database workload 101 may comprise different users using different applications running in different time slots. The database workload includes a series of different statements per user and per application. The database workload 101 comprises two users: "Alice" 108 and "Bob" 109, two different types of applications: "finance" 110 and "logistics" 111 and a different series of statements, as for example "select * from customers where name='Alice' and surname='P'" 112. Before the database workload 101 is further processed, this data is classified and filtered according to the users, the application type, the time slot or a combination of them.

In this example, the filter selects the statements from the user "Alice" and the application type "finance". These statements form a second table in a further step that consists of generalizing the statements 102, also known as anonymization of the statement, by replacing the variable parameters of the statement with the constant "?" as shown in table 102. For example, the statement "select * from customers where name='Alice' and surname='P'" is formed of statement text 113 and a variable parameter 114, that corresponds to the input "Alice" and "P". In the process of generalization or anonymization, the concrete parameter "Alice" and "P" are substituted with a constant value that in the example corresponds to a question mark. This process is repeated for all the statements that have been filtered out of the original database workload, substituting all the concrete parameters from the other statements as "Parker", "Richard", "M" or "12" with the question mark. The generalized statements are also known as anonymized statements.

Two statements are similar if the generalized statement text is the same. The third step of the method of generating a transactions prediction model includes generating a new generalized statement for each statement with a different statement text. Table 103 shows an example of all the statements with a common generalized statement and, where for example, the two statements "select from customer where name=Alice and surname=P" and "select from customers where name=Richard and surname=M" correspond to the same generalized statement "select from customers where name=? and surname=?". The creation of generalized statements is a dynamic process as new generalized statements may be generated according to the appearance of new types of statements with different statement texts.

After the dynamic classification or generation of the generalized statements has been completed, the transactions classes are created as shown in table 104. The transaction classes are grouping all transactions with a same sequence of generalized statements (102). Table 104 includes two types of transactions "A" and "B", where "A" 115 includes two generalized statements as "select * from customer where name=? and surname=?" and "select from account where K&R=?". The second transaction "B" 160 includes two generalized statements as are: "insert into customer values (?,?)" and "insert into account values".

The method of generating a transaction prediction model will then store all the transitions between the transactions for a specific user and/or application during a specific period of time and identify possible sequences between transactions by calculating the transition probability between two transactions, using all the previous completed transactions of the user and/or application. Further, it will compare at least a first issued generalized statement with at least a first statement of the transaction classes for identifying the current transaction class. In order to predict the next transaction class and/or the sequence of generalized statements, the model uses the highest probability of the calculated probabilities of the transaction class.

FIG. 2 shows an example of the of a prediction model implemented by a Markov model. The transactions prediction model example includes four transaction classes A, B, C, D, an Init state 201 and a termination state 202. The transactions prediction model further comprises eight transitions with their respective transition probabilities between the transaction classes.

This prediction model is the result of the observation analysis of the database workload during a predetermined period of time, and according to the steps shown in FIG. 1. In the Init state 201, according to the example model, there is 100% probability that it will make a transition to the transaction class A. Transaction class A includes a sequence of two generalized statements according to table 104. When this sequence has been completed, there is 100% probability that the transition from current transaction class A leads to transaction class B. Transaction class B includes a sequence of two generalized statements and, when these two generalized statements have been completed, there are two possible transitions: from B→C or from B→A. The transition from transaction class B to transaction class C has an 89% probability, and the transition from B to A has a 9% probability. There is a third possible transition from B to the termination state 202 with a probability of 2%. As the transition with the highest probability is the one from B to transaction class C, the model predicts that the next transaction class will be C. Transaction class C has two transition possibilities, 60% probability of doing a transition to transaction class D and a 40% probability of leading to transaction class A. The highest probability corresponds to the next transaction class D. If the prediction model fails on correctly predicting the next transaction class, the sequence of generalized statements for all transactions, as shown in 104, contains the information that allows the model predicting the sequence of generalized statements for the current transaction, so that this information is also used to improve the performance of the database system.

Figure 3:
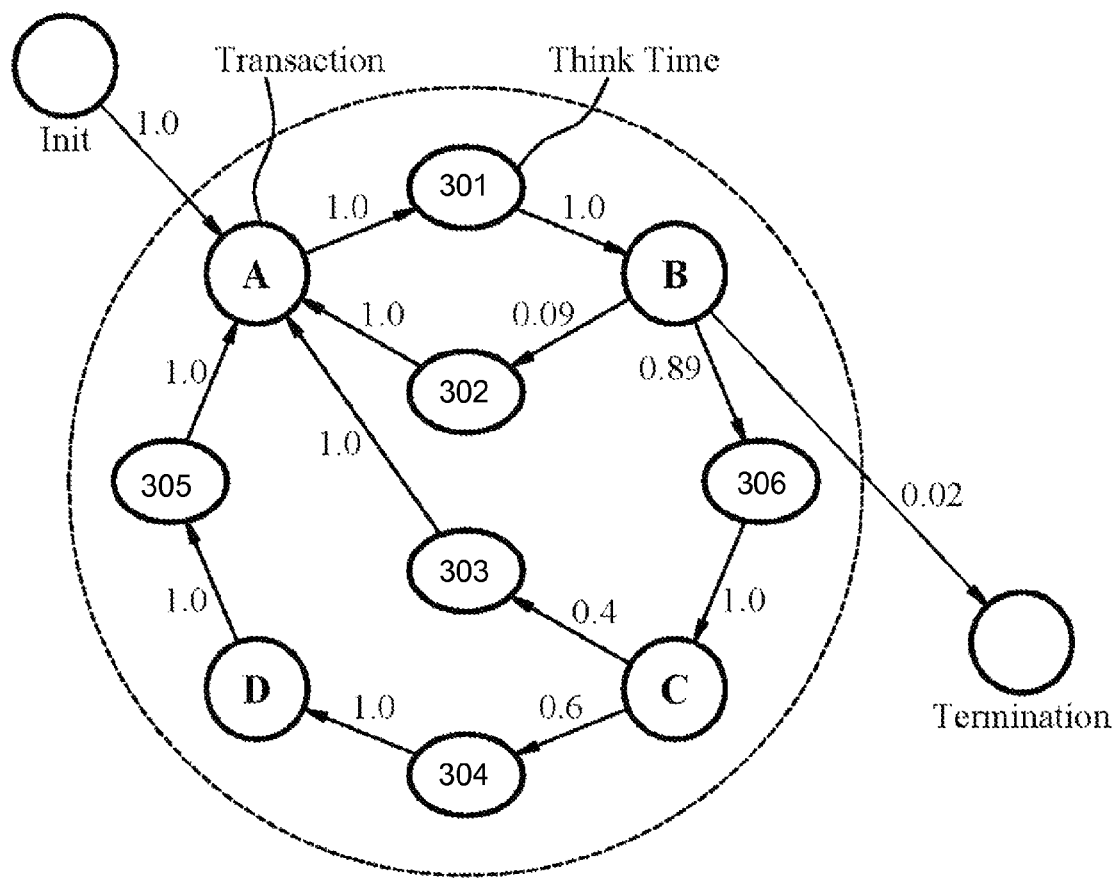
FIG. 3 shows a further example of a more detailed result of the transaction prediction model.

FIG. 3 shows a more detailed example of a transaction prediction model implemented by a Markov model, by including the think times between the transaction classes (301-306). The think time information is necessary in order to predict the starting time of the next predicted transaction class. A think time between the generalized statements in one transaction class may also be included in the model. The think times can be derived from the captured database workload. A distribution function of the think times can be approximated through the analysis of the arrival times of the statements with the captured database workload. FIG. 3 comprises all the transaction classes A, B, C, D and their transitions according to FIG. 2 and further comprises the think times for all these transitions.

For example, the think time 301 comprises a uniform distribution with a minimum of 60 seconds and a maximum of 120 seconds. In this example, the probabilities of the transition from the think time to the next transaction class correspond to 100% probability of transition. This predictions model corresponds to a specific type of application and for a specific user. A more specific predictions model may be calculated and may include prediction models for a specific time slot as a day of the week or a day of the month, or a specific time during the day.

Figure 4:
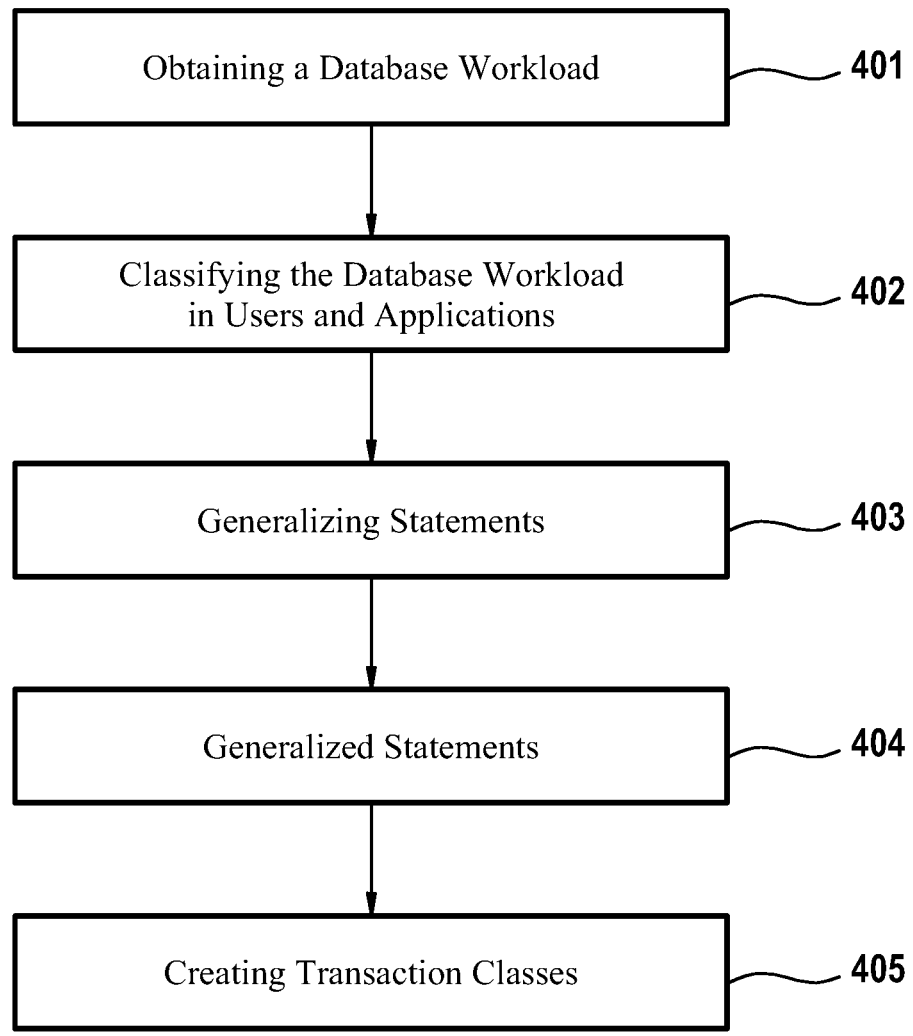
FIG. 4 shows a flowchart of the method of generating a transaction prediction model according to an embodiment of the invention.

FIG. 4 shows a flowchart of the method of generating the transaction classes for the prediction model in a database system. The first step 401 corresponds to capturing a database workload; the database workload including a list of the statements, the users, application, transaction ids and the time slot for each statement. The second step 402 classifies the database workload in users and applications according to the transactions needed for the prediction model that requires to be generated. The first step 403 generalizes the list of statements from the database workload by replacing the variable parameter with a constant value. The fourth step 404 generates a generalized statement for each statement with a different statement text. The fifth step 405 creates transaction classes by grouping all transaction with a same sequence of generalized statements using the transaction id (117).

With this information, the method identifies possible sequence between transaction classes by calculating probabilities of transitions between transaction classes and compares the issued generalized statements with the generalized statements of the transaction classes in order to identify the current transaction class. This comparison takes into consideration the position and amount of previous issued generalized statements and compares an equal number of issued generalized statements and the statements of the transaction classes. The method will then generate a possible sequence between transaction classes and calculates the probability of transitions between the transaction classes.

Figure 5:
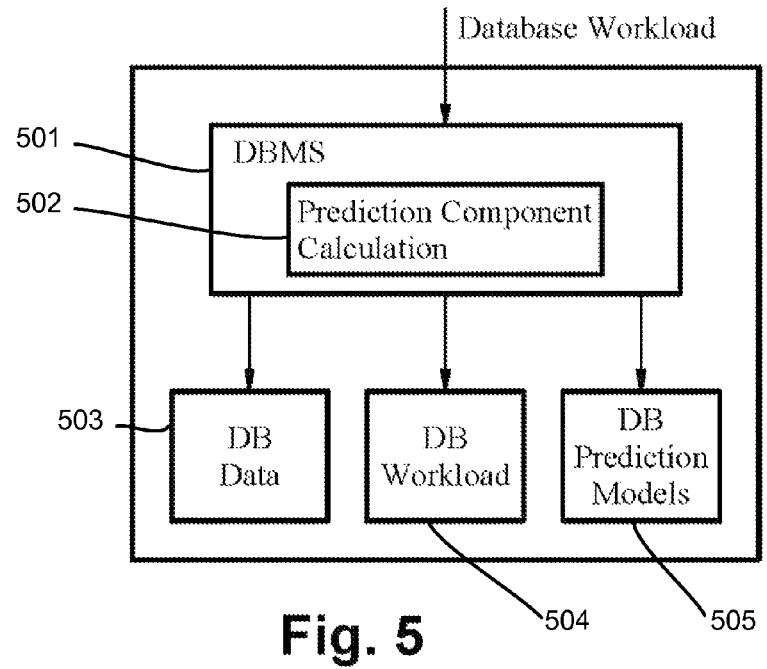
FIG. 5 shows a block diagram of the database systems in accordance with an embodiment of the invention.

FIG. 5 shows a block diagram of a database system that generates the transactions prediction model including a database management system 501, which further comprises the means for calculating the prediction model 502. The system comprises the database data 503, the database workload 504 and the database of the prediction models 505.

During the capturing period of the database workload, the database management systems receives the workload data, which is used as commands to be completed by the database management system, and are also stored into the database workload table 504. The information stored in the database workload table 504 is filtered according to the prediction model of the specific user and/or specific application, and possibly for a predetermined time slot, that requires to be generated. The means for calculating the prediction model 502 completes the following steps: generalizes the list of statements; generates the generalized statements for each statement with a different statement text; creates transaction classes; identifies possible sequence between transactions; identifies the current transaction and calculates the probabilities of transitions between the transactions.

With the information generated by the means for calculating the prediction model 502 a transactions prediction model for the specific user, application and time slot is generated and stored in the prediction model database 505. The same process is completed for different type of users, applications and time slots that are stored in the database 505 and that are later used in order to predict the next transaction and improve the performance of the queries for the database data 503.

Figure 6:
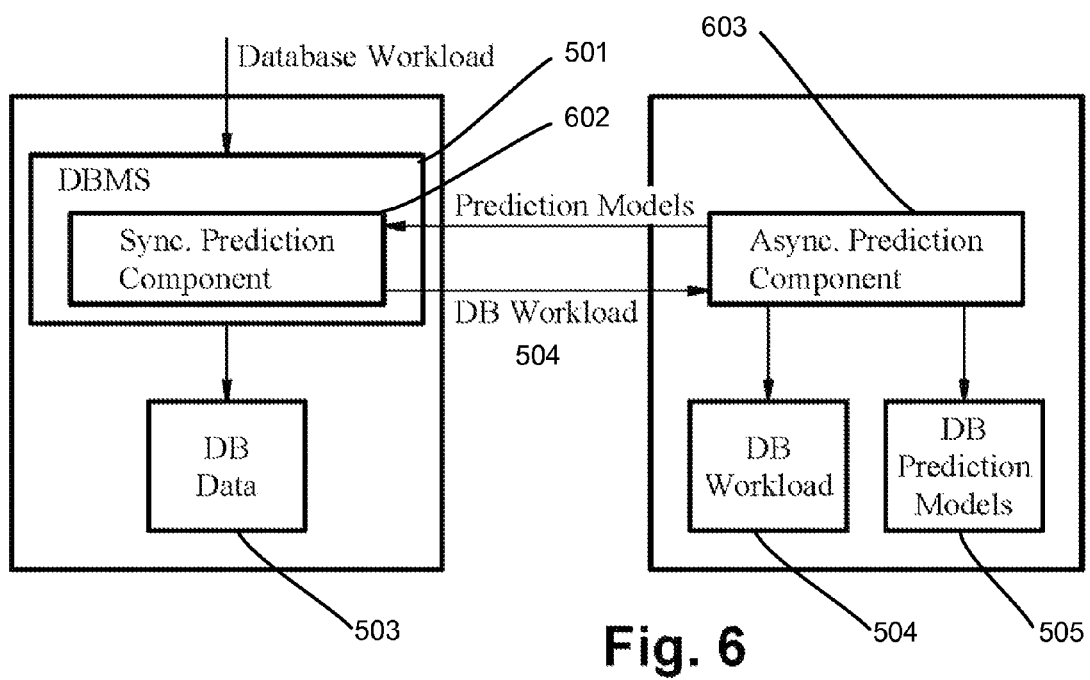
FIG. 6 shows a second block diagram of the database system in accordance with an embodiment of the invention.

FIG. 6 shows a flowchart of a database management system 600 according to a second embodiment of the invention that separates the generation of the model and the execution of the real time prediction component in order to save resources on the system. The database system includes a database management system 501, an asynchronous prediction component 602, a database data 503 and an asynchronous means for calculating the prediction model 603, database workload 504 and a prediction model database 505.

The database management system 501 sends the database workload 506 to the asynchronous means for calculating the prediction model 603 that calculates and generates the transaction classes and prediction models and stores the prediction models in the database 505. The means for calculating the prediction model is located on a second system separated from the database management system. After the generation of the prediction models, these are submitted to the synchronous prediction component 602 that uses them in order to predict the next transaction class and/or the sequence of the generalized statements. The asynchronous prediction component 603 can be also used for the tuning tasks that are not directly real time critical and that may have a delay in computation. This embodiment with the asynchronous prediction component 603 in a second server generates the prediction model using the historical workload data and does not need to observe the database workload in real time.

While the foregoing has been with reference to particular embodiments of the invention, it will be appreciated by those skilled in the art that changes in these embodiments may be made without departing from the principles and spirit of the invention, the scope of which is defined by the appended claims.

| List of Reference Numbers | |
|---|---|
| 101 | Database workload |
| 102 | Generalized statement |
| 103 | Generate generalized statement |
| 104 | Sequence of generalized statements |
| 105 | User |
| 106 | Application Type |
| 107 | Time Slot |
| 108 | User "Alice" |
| 109 | User "Bob" |
| 110 | Finance |
| 111 | Logistics |
| 112 | "Select from customers . . . " |
| 113 | Statement text |
| 114 | Variable parameter |
| 115 | Transaction A |
| 116 | Transaction B |
| 201 | Init |
| 202 | Termination |
| 301 | Think time |
| 302 | Think time |
| 303 | Think time |
| 304 | Think time |
| 305 | Think time |
| 306 | Think time |
| 401 | First step |
| 402 | Second step |
| 403 | Third step |
| 404 | Forth step |
| 405 | Fifth step |
| 501 | DBMS |
| 502 | Prediction component |
| 503 | DB Data |
| 504 | DB Workload |
| 505 | DB Prediction model |
| 506 | Database workload |
| 602 | Sync. Prediction comp. |
| 603 | Async. Prediction comp. |

What is claimed is:

1. A database system configured for creating and utilizing a plurality of transactions predictive models using a computer, the database system comprising:
   a database management system (DBMS) for handling a plurality of database transactions in the database system, the DBMS including a prediction component for generating the plurality of transactions predictive models;
   a database workload table for capturing a plurality of commands associated with the plurality of database transactions, the plurality of commands utilized for generating the plurality of transactions predictive model;

database data for providing data in response to the plurality of database transactions; and a prediction model database for storing the plurality of database transactions predictive models, wherein the prediction component is configured for generating a generalized statement for each statement corresponding with the plurality of database transactions in the database workload table by replacing a variable parameter with a constant value, wherein the generalized statement is anonymized from the statement corresponding with the plurality of database transactions, identifying a sequence of transactions of the plurality of transactions, creating a plurality of transaction classes based on grouping the sequence of transactions having a same generalized statement, identifying a current database transaction, and calculating transition probabilities of possible sequences between the plurality of transaction classes to generate the transactions prediction model, wherein each statement includes at least a database command, and the database system wherein the prediction component is further configured to receive the current database transaction, to identify one of the plurality of transaction classes corresponding with the current database transaction from one of the plurality of transactions prediction models, to predict a next transaction class based on a highest transition probability of the one of the plurality of transactions prediction models, and to pre-fetch data associated with the next transaction class.

2. The database system of claim 1, wherein the DBMS further comprises:
a synchronous prediction component for utilizing one of the plurality of transactions predictive models in real time, the synchronous prediction component configured to access at least the database data in real time.

3. The database system of claim 2, wherein the DBMS further comprises:
an asynchronous prediction component for generating the plurality of transactions predictive models not substantially in real time, the asynchronous prediction component configured to access at least the database workload table and the prediction model database.

4. The database system of claim 3, wherein the asynchronous prediction component is located on a separate system from the DBMS and generates the plurality of transactions predictive models using an historical workload data.

5. The database system of claim 3, wherein the asynchronous prediction component submits the plurality of transactions predictive models to the synchronous prediction component after the plurality of transactions predictive models are generated.

6. The database system of claim 1, wherein the plurality of commands are filtered by one of the group consisting of: a specific user, a specific application, a transaction ID, and a predetermined time slot.

7. The database system of claim 1, wherein the prediction component is further configured to incorporate the current database transaction into the one of the plurality of transactions prediction models if the pre-fetched data is incorrect.

8. The database system of claim 1, wherein the plurality of transaction classes are classified in classes selected from the group consisting of: a user class, a time slot class, and an application class.

* * * * *